United States Patent
Considine et al.

(10) Patent No.: US 9,476,527 B2
(45) Date of Patent: Oct. 25, 2016

(54) QUICK CONNECTOR FOR HYDRAULIC HOSE COUPLING

(71) Applicant: Caterpillar Inc., Peoria, IL (US)

(72) Inventors: Patrick E. Considine, Aurora, IL (US); Carl H. Rempert, Shorewood, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/658,932

(22) Filed: Mar. 16, 2015

(65) Prior Publication Data

US 2016/0273685 A1    Sep. 22, 2016

(51) Int. Cl.
| | |
|---|---|
| *F16L 19/00* | (2006.01) |
| *F16L 21/035* | (2006.01) |
| *F16L 21/08* | (2006.01) |
| *F16L 37/113* | (2006.01) |
| *F16L 37/107* | (2006.01) |

(52) U.S. Cl.
CPC ............. *F16L 19/00* (2013.01); *F16L 21/035* (2013.01); *F16L 21/08* (2013.01); *F16L 37/107* (2013.01); *F16L 37/113* (2013.01)

(58) Field of Classification Search
CPC ..... F16L 37/00; F16L 37/113; F16L 37/107; F16L 37/24; F16L 37/244; F16L 37/248; F16L 37/252; F16L 37/10; F16L 37/101; F16L 37/105; F16L 37/2445; F16L 21/035; F16L 21/08; F16L 19/00; F16L 19/0212; F16L 19/0218
See application file for complete search history.

(56) References Cited

U.S. PATENT DOCUMENTS

| | | | |
|---|---|---|---|
| 1,253,065 A | | 1/1918 | Looze |
| 1,333,342 A | * | 3/1920 | Moss ................ F16L 37/107 285/101 |
| 2,896,977 A | * | 7/1959 | Hansen ............. F16L 37/107 137/614.04 |
| 3,513,436 A | | 5/1970 | Nodfelt |
| 3,540,762 A | * | 11/1970 | Dunlap .............. F16L 37/105 285/391 |
| 3,649,052 A | * | 3/1972 | Snyder, Jr. .......... F16L 37/248 285/279 |
| 3,698,744 A | * | 10/1972 | Bevington ........... F16L 17/035 285/111 |
| 3,712,583 A | * | 1/1973 | Martindale .......... F16L 29/02 251/149.4 |
| 4,142,642 A | * | 3/1979 | Myers .................. E02F 3/32 280/421 |
| 5,343,892 A | * | 9/1994 | Saito ................... F16L 37/10 137/614.04 |
| 6,226,068 B1 | | 5/2001 | Arcykiewicz et al. |
| 2005/0206163 A1 | * | 9/2005 | Guesnon ............. F16L 37/107 285/402 |
| 2013/0133769 A1 | * | 5/2013 | Kuo .................... B60C 29/06 137/800 |
| 2014/0225365 A1 | * | 8/2014 | Volker ................ F16L 37/084 285/256 |
| 2015/0276110 A1 | * | 10/2015 | Parekh ................ F16L 37/113 285/307 |
| 2015/0316087 A1 | * | 11/2015 | Hyzin ................. F16B 21/06 403/327 |

FOREIGN PATENT DOCUMENTS

GB        2506148 A        3/2014

* cited by examiner

*Primary Examiner* — Drew Brown
(74) *Attorney, Agent, or Firm* — Miller, Matthias & Hull LLP

(57) ABSTRACT

A hydraulic fluid line coupling system is disclosed. The coupling may include a female fitting, a male fitting, first and second elastomeric seals between the female fitting and male fitting, and a twist nut surrounding the female fitting, male fitting, and first and second elastomeric seals.

12 Claims, 6 Drawing Sheets

QUICK CONNECTOR FOR HYDRAULIC HOSE COUPLING

TECHNICAL FIELD

The present disclosure generally relates to hydraulic systems and, more particularly, relates to couplings for hydraulic hoses and tubes of hydraulics systems.

BACKGROUND

Hydraulics are used in numerous applications. For example, with earth moving, construction, and agricultural equipment, various implements and attachments are powered by hydraulic cylinders. Using a track-type tractor as an example, the blade, bucket or other implement on the front of the loader are attached to boom arms swingably attached to the chassis of the track-type tractor. Movement of the boom arms and implements are powered by hydraulic cylinders. The hydraulic cylinders are in turn in fluid communication with a hydraulic fluid pump powered by an engine mounted on the chassis. Accordingly, it can be seen that multiple couplings are needed when communicating the hydraulic fluid from the pump to the cylinders.

While effective, and used for decades, the couplings between the various tubes and hoses of the hydraulic system are particularly prone to leakage. Such leakage necessarily detrimentally affects the efficiency of the machine, adds cost to operation of the machine, and disturbs the environment.

In light of the foregoing, it has been known to provide robust couplings between the hydraulic conduits of such hydraulic systems. Such robust couplings typically include a plurality of threaded bolts connecting fittings attached to the adjacent hydraulic hoses. The inclusion of multiple bolts, typically four, thus makes it a fairly time consuming process to connect and disconnect conduits. In addition, current couplings are rotationally sensitive in that the mating halves of the coupling must be symmetrically aligned before the bolts can be attached. This also adds to the time involved with changing conduits. Moreover, leakage from such robust connectors continues to be problematic.

With respect to patented technology, U.S. Pat. No. 7,490,388 discloses a clamp for connecting a duct to a base surface which includes a hinged clamp assembly sized so as to circumscribe the ducts being joining. A threaded bolt removably connects the two halves of the clamp together. However, such a device does not provide any sealing capability whatsoever.

Accordingly, it can be seen that a need exists for a hydraulic fluid line coupling system with improved resistance to leakage, reduced reliance on rotational orientation of the coupling components, quick assembly and disassembly, and which is designed for reduced likelihood of accidental pressure discharge.

SUMMARY

In accordance with one aspect of the disclosure, hydraulic fluid line coupling system is disclosed which may comprise a female fitting, male fitting, a first elastomeric seal between the female fitting and the male fitting, a second elastomeric seal between the female and male fittings, and a twist nut securing the female fitting to the male fitting.

In accordance for another aspect of the disclosure, a method of sealing a hydraulic fluid line coupling system is disclosed which may comprise inserting a male fitting into a female fitting, sealing the male fitting to the female fitting using first and second elastomeric rings, and securing the male fitting to the female fitting using a twist nut.

In accordance with yet another aspect of the disclosure, machine is disclosed which may comprise a chassis, engine mounted on the chassis, a hydraulic fluid pump powered by the engine, hydraulic cylinder in fluid the communication with the hydraulic fluid pump, a plurality of a hydraulic fluid tubes connecting the hydraulic fluid pump and the hydraulic cylinder, and a hydraulic fluid line coupling system connecting the plurality of the hydraulic fluid tubes together, each hydraulic fluid line coupling system including a male fitting, a female fitting, a first and second elastomeric seals between the male and female fittings, and a twist nut securing the female fitting to the male fitting.

These are other aspects and features of the present disclosure will be more readily understood when read in light of the following detailed description when taken in conjunction with the accompany drawings.

While the present disclosure is susceptible to various modifications and alternative construction, certain illustrative embodiments that are shown and described below in detail. However, it is to be understood that the present disclosure is not limited to the specific embodiments disclosed, but instead includes all modifications, alternatives, constructions, and equivalents thereof.

DETAILED DESCRIPTION

Figure 1:
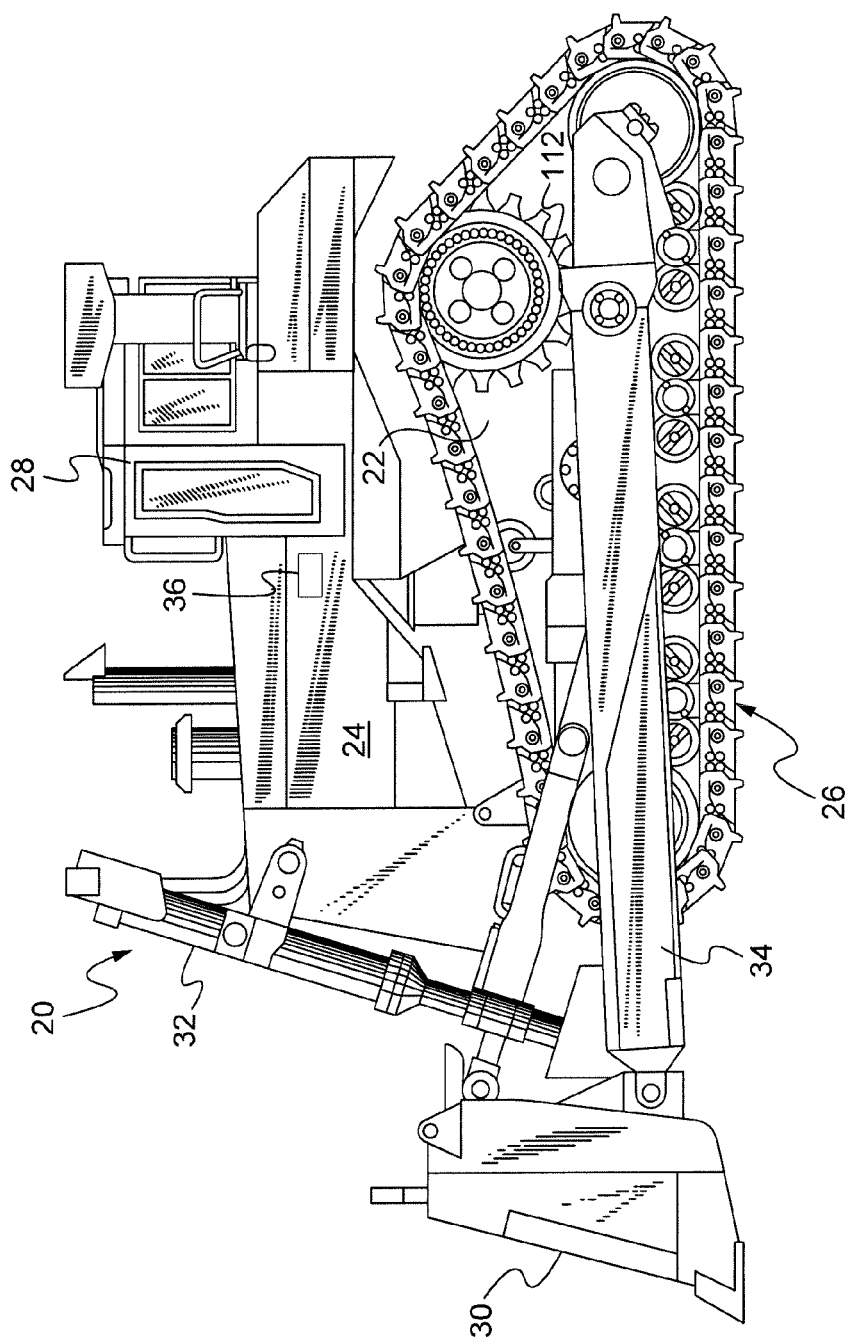
FIG. 1 is a perspective view of a machine constructed in accordance with the teachings of the present disclosure.

Referring now to drawings, and with specific reference to FIG. 1, a machine constructed in accordance to the teachings of the present disclosure is generally referred to by reference numeral 20. While the machine 20 is depicted as a track-type tractor, it is to be understood that the teachings of the present disclosure can be used with equal efficacy in connection with any other number of earth-moving machines including but not limited to loaders, motor graders, pipe layers, skid steers and the like. In addition, the teachings of the present disclosure can be used outside of earth-moving equipment including, but not limited to, other construction, agricultural, mining, marine, and on-highway machines.

With respect to the machine 20, it is shown to include a chassis 22 on which is mounted an engine 24. The machine 20 further includes first and second tracks 26 laterally flanking the machine, although in other embodiments, the form of locomotion may be provided in alternative formats such as, but not limited to, wheels. In addition, the chassis 22 supports an operator cabin 28.

As also illustrated in FIG. 1, the machine 20 may include one more implements 30 provided to perform useful work.

The implement 30 depicted in FIG. 1 is a blade, but other implements are certainly possible and well known. The implement 30 is movable relative to the machine 20 by way of one or more hydraulic cylinders 32 and boom arms 34. The hydraulic cylinders 32 are in fluid communication with a hydraulic fluid pump 36 by way of a plurality of hydraulic fluid conduits 38. The pump 36 in turn is powered by the engine 24.

Figure 2:
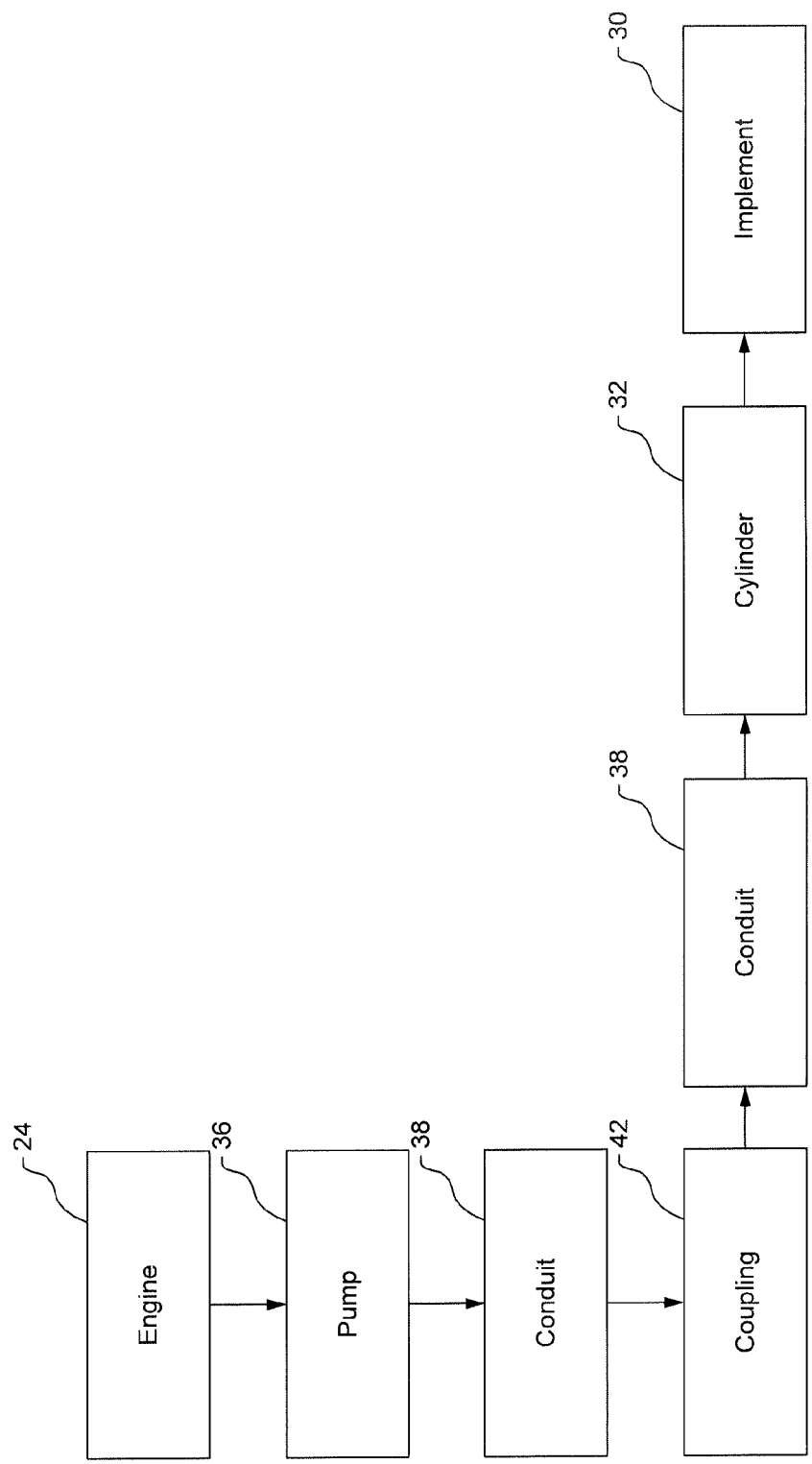
FIG. 2 is a schematic illustration of a hydraulic system constructed in accordance with the teachings of the present disclosure.

Turning now to FIG. 2, a schematic illustration of a hydraulic fluid system 40 constructed in accordance with the teachings of the present disclosure is provided. As shown therein, the hydraulic fluid system 40 includes the aforementioned pump 36 in fluid communication with the hydraulic cylinders 32 by way of conduits 38. In addition, FIG. 2 further illustrates that the plurality of hydraulic fluid conduits 38 are connected by way of hydraulic fluid line coupling systems 42 as will now be described in further detail.

Figure 4:
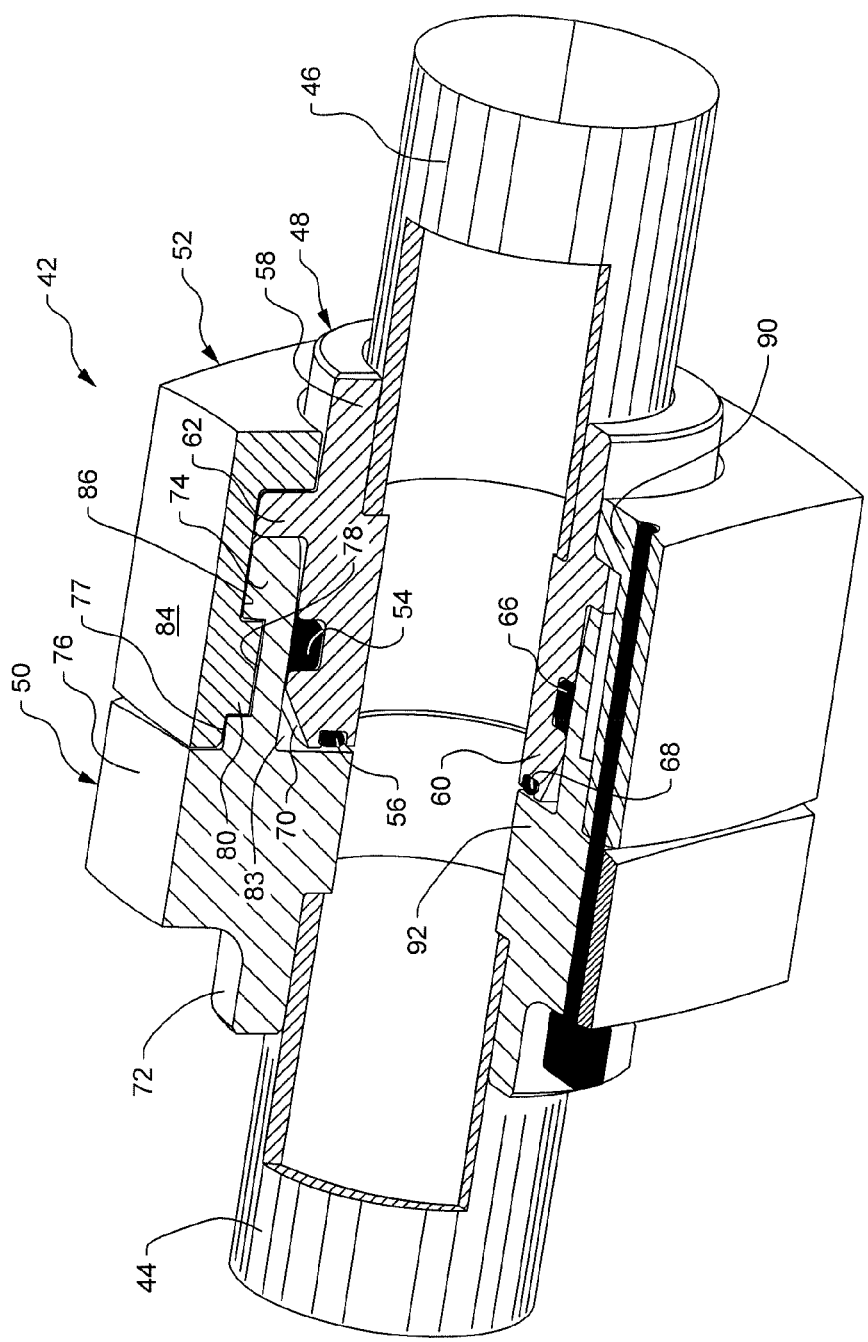
FIG. 4 is a cross-sectional view of the hydraulic fluid line coupling system of FIG. 3, with hydraulic hoses attached.

The hydraulic fluid line coupling system 42 is shown, in FIG. 4 connecting a first hydraulic fluid tube or hose 44 to a second hydraulic fluid tube 46. While hydraulic fluid tube couplings have been known in the prior art, the present disclosure drastically improves on such attempts by having improved sealing capability, no reliance on rotational orientation of the tubes, quicker assembly and disassembly, lower costs to manufacture, and improved resistance to accidental pressure discharge.

Figure 3:
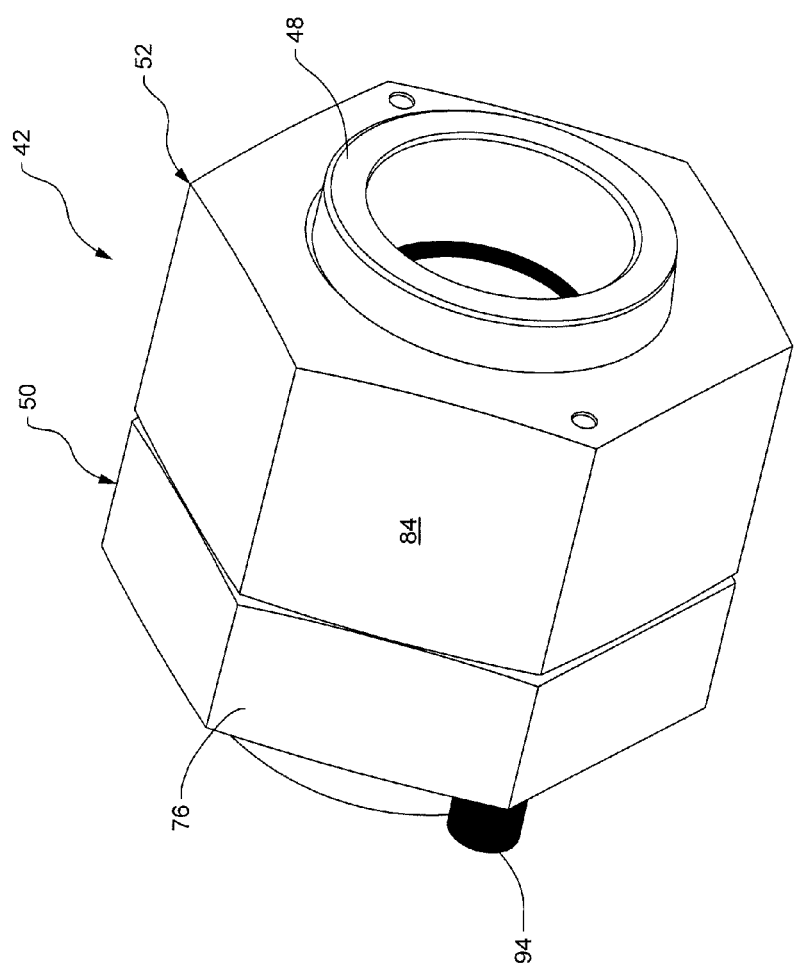
FIG. 3 is a perspective view of a hydraulic fluid line coupling system constructed in accordance with the teachings of the disclosure.
Figure 5:
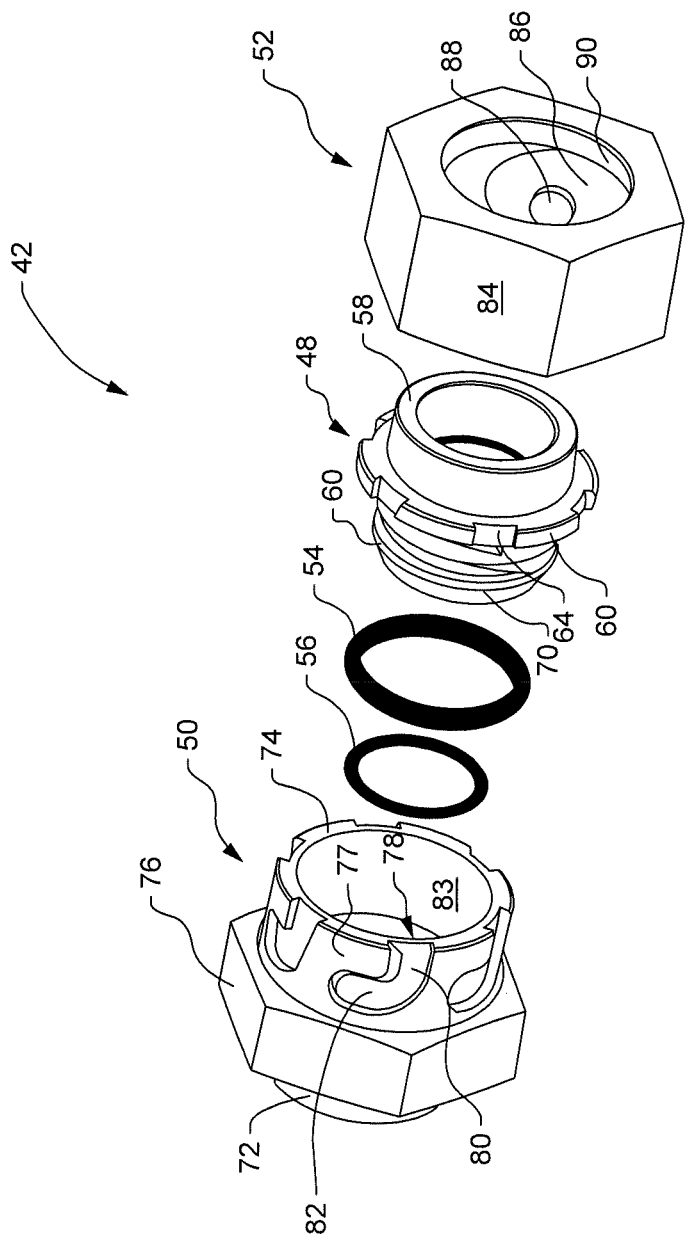
FIG. 5 is an exploded view of the hydraulic fluid line coupling system of FIG. 3.

As shown in FIGS. 3-5, the hydraulic fluid line coupling system 42 includes a male fitting 48, a female fitting 50, a twist nut 52, a first elastomeric seal 54 and a second elastomeric seal 56. With specific reference to FIG. 5, the male fitting 48 is shown in detail to be substantially cylindrical in shape including a hose or proximal end 58 and a sealing or distal end 60. Intermediate the proximal and distal ends 58 and 60 the male fitting 48 is shown to also include a radially outwardly extending rib 62. The rib 62 is segmented by a plurality of circumferentially space gaps 64, as shown in FIG. 5, the importance of which will be described in further detail herein. The distal end 60 further includes a circumferential or radial groove 66, a face or axial groove 68, and a tapered rim 70.

With respect to the female fitting 50, it is also shown in detail in FIG. 5. The female fitting 58 is also substantially cylindrical in shape including a proximal or hose end 72 and a distal or sealing end 74. A radially outwardly extending flange 76 is provided there between. Although the flange 76 is shown to have a hexagonal shape in cross-section, other shapes are certainly possible. A cylindrical extension 77 extends from the flange 76. In addition, the distal end 74 is shown to include a plurality of angled grooves 78 (see FIG. 5) in the cylindrical extension 77 to facilitate receipt of the male fitting 48. More specifically, each angled groove 78 includes a longitudinal leg 80 and a lateral leg 82. Although the lateral leg 82 is shown at a right angle to the longitudinal leg 80, other angles are possible. The cylindrical extension 77 includes a radially inner cylindrical wall 83.

Turning to the twist nut 52, it is shown best in FIG. 5 to include a hexagonal outer surface 84 and a cylindrical inner surface 86. Extending radially inward from the inner surface a plurality of tabs 88. In the depicted embodiment, there are six tabs 88, but in other embodiments a different number may be provided. In one embodiment, the number of tabs 88 corresponds to the number of angled grooves 78, and the number of gaps 64. In addition, the twist nut includes a radially inwardly directed shoulder 90.

Finally, also depicted in FIG. 5 are the first elastomeric seal 54 and the second elastomeric 56. Whereas the male fitting 48, female fitting 50 and twist nut 52 are manufactured from rigid materials such as, but not limited to, steel and other metals, the elastomeric seals 54 and 56 are manufacture from flexible materials such as, but not limited to, rubber and polymeric o-rings, gaskets, and the like. While the depicted embodiment shows the first elastomeric seal 54 as a radial seal and the second elastomeric seal 56 as a face seal, it is to be understood that in other embodiments, the second elastomeric seal 56 could be provided as a second radial seal. In still further embodiments, more than two seals could be provided.

When assembled, the hydraulic fluid line coupling system 42 joins the first tube 44 and second tube 46, as shown best in FIG. 3, in a fluid tight arrangement with redundant seals for robustness against leaks, no reliance on rotational orientation of the various components for assembly, quick assembly, and greatly improved ability to prevent accidental pressure discharges. These features are perhaps best illustrated in the sectional view of FIG. 4. As will be noted therein, the redundant sealing feature is provided by way of the first elastomeric seal 54 and second elastomeric seal 56. As shown therein, the first elastomeric seal 54 is sized so as to be inserted within the circumferential groove 66 of the male fitting 48. When the female fitting 50 is received around the male fitting 48, the first elastomeric seal 54 is compressed within the first circumferential groove 66 so as to prevent any fluid transmission therebetween. To improve the longevity of the radial seal 54, a back-up ring (not shown) could be used. The back-up ring could be annular in shape and reside within the radial groove 66 to support the radial seal 54 so as to not extrude due to hydraulic pressure. In some embodiments, more than one back-up ring could be used so as to flank the radial seal and provide support from both sides.

In addition, the second elastomeric seal 56 is received within the axially groove 68 such that when the male fitting 48 is thoroughly received within the female fitting 50, the second elastomeric seal 56 is compressed against a shoulder 92 of the female fitting 50. In addition, so as to facilitate fluid tight engagement between the male and female fittings 48 and 50, it will be noted that the tapered rim 70 is provided so as to draw the male fitting fully against the shoulder 92 when the hydraulic fluid line coupling system 42 is assembled.

While the first and second elastomeric seal 54 and 56 provide the redundant sealing capabilities guarding against leaks, the improved ability of the hydraulic fluid line coupling system 42 against accidental pressure discharge is provided by way of the twist nut 52. As shown best in FIG. 4, the tabs 88 of the twist nut are received in the angled grooves 78 of the female fitting 50. More specifically, the twist nut 52 is rotationally aligned with the female fitting 52 such that the tabs 88 are aligned with the angled grooves 78 of the female fitting 50. The twist nut is the slid over the female fitting 50, with the tabs 88 passing through the gaps 64 and the longitudinal legs 80. The twist nut 52 is then rotated such that the tabs 88 traverse along the lateral legs 82, thereby locking the twist nut 52 in place. In addition, the radially inwardly directed shoulder 90 of the twist nut 52 engages the radially outwardly directed rib 62 of the male fitting 48 in such a position. Locking pins 94 also extend through the female fitting 50 and twist nut 52 to further ensure the coupling 42 is locked in place. In so doing, the female fitting 50 is secured to male fitting 48 in such a way that the hydraulic fluid line coupling system 42 cannot be accidentally disconnected and thus accidental pressure discharges are avoided.

Not only does the hydraulic fluid line coupling system 42 of the present disclosure provide for improved sealing and accidental pressure discharge prevention, but as will be noted, all of the components described above are not reliant on any particular rotational orientation so as to be effective. This is in marked contrast to prior art couplings which required the connecting components of the coupling to be rotated in a particular orientation before being connected. In so doing, the speed with which the coupling 42 can be assembled and disassembled is greatly improved.

Figure 6:
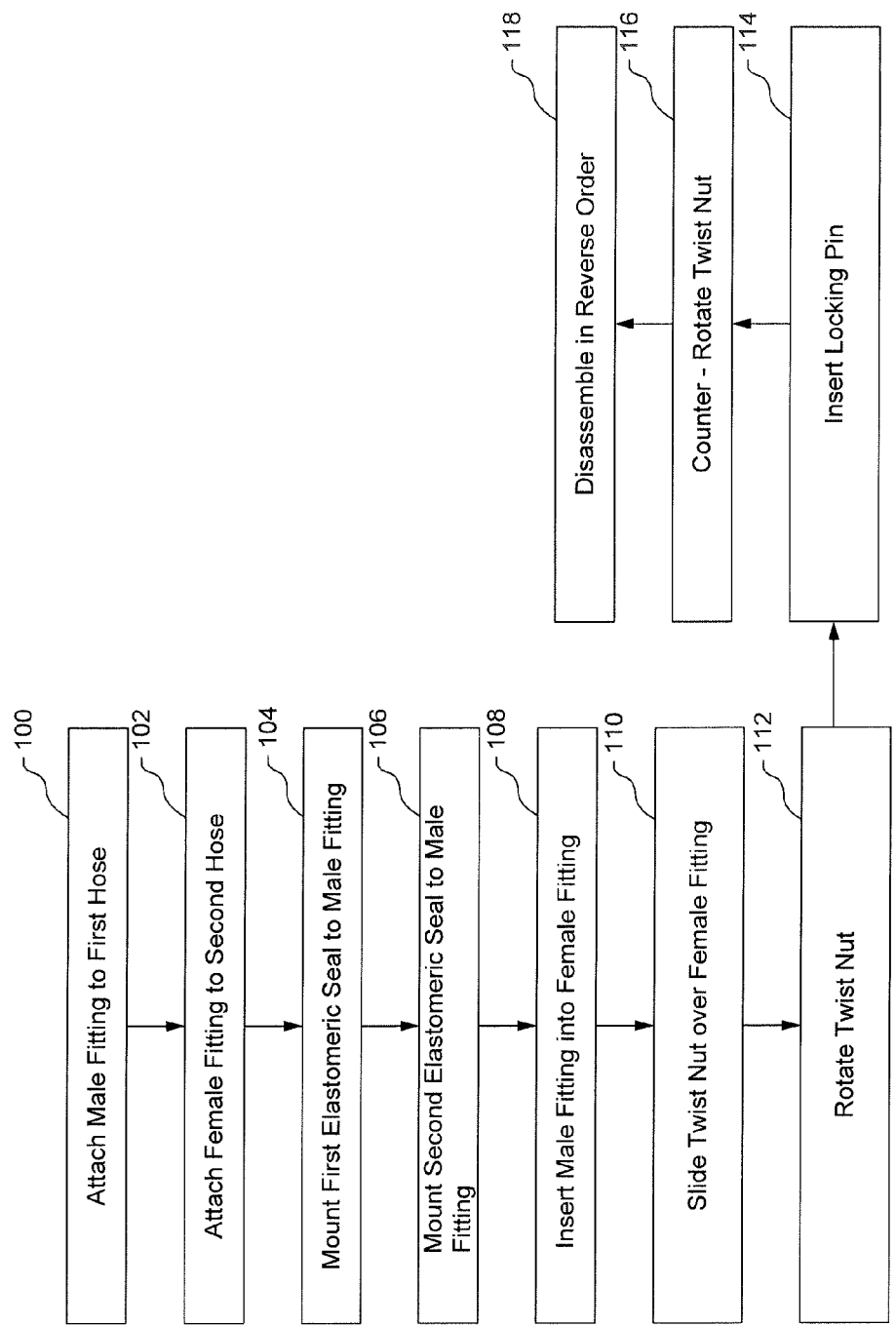
FIG. 6 is a flow chart depicting a sample sequence of steps which may be practiced in accordance with the teachings of the present disclosure.

Referring now to FIG. 6, a flow chart depicting the sample sequence of steps which may be practiced in conjunction with the teachings of the present disclosure is provided. Stated differently, the present disclosure does not only set forth structure enabling improved sealing capability and hydraulic fluid line coupling system, but also a method of improved sealing and hydraulic fluid line coupling system as well.

Starting with a step 100, the method includes attaching the male fitting 48 to the first tube 44. This may be done as by crimping, welding, brazing or the like. Similarly, in a second step 102, the female fitting 50 is attached to the second tube 46. Once the male and female fittings 48 and 50 are attached to the tubes 44 and 46, the first and second elastomeric seals 54 and 56 are mounted to the male fitting 48 as indicated in steps 104 and 106. In a next step 108, the male fitting 48 is then inserted into the female fitting 50 with the first and second elastomeric seals 54 and 56 being compressed there between. In order to secure the tubes 44 and 46 together, the twist nut 52 is then slid over the female fitting 50 such that the tabs 88 slide within the longitudinal legs 80 of the female fitting 50 as shown in a step 110. The twist nut 52 is then rotated in a step 112, such that the tabs 88 move within the lateral legs 82. The locking pins 94 may then by inserted in a step 114.

While the foregoing sets forth a method for connecting the first and the second tubes 44 and 46, it is to be understood that the method of the present disclosure also includes a method for quickly disassembling the hydraulic fluid line coupling system 42 as well. In so doing, in a step 116, the hydraulic fluid line coupling system 42 is disassembled simply by counter-rotating twist nut 52 and conducting the steps 100 through 114 in reverse order as shown by step 118.

INDUSTRIAL APPLICABILITY

In operation, the present disclosure can find industrial applicability, in a number of different settings. For example, in the construction of earth moving machines, multiple hydraulic fluid tubes are routed in and around the machine. As each of those tubes needs to be interconnected, the present disclosure sets forth a coupling for doing so in a reliable sealed manner without any reliance upon the rotational orientation of the components. In addition, it does so quickly, at a minimal of cost, and with greatly improved ability to prevent accidental pressure discharge.

With respect to improved sealing capability, such is set forth by providing redundant seals in the form of first and second elastomeric seals between the male and female fitting of the coupling. In so doing, if one seal were to degrade or even fail, the second seal will be able to continue to provide leakage prevention.

With respect to avoiding rotational orientation reliance, it can be seen that each of the components of the coupling are provided in symmetric fashion such that regardless of the rotational orientation of the components the coupling can be assembled and disassembled with ease.

With respect to speed of assembly and disassembly, as opposed to prior art devices which both require a specific rotation orientation to be operable, and multiple fasteners for providing the seal, the present disclosure provides a single twist nut which simply needs to be rotated for the coupling to be assembled, and counter-rotated for the coupling to be disassembled.

Finally, with regard to prevention of accidental pressure discharge, as the assembly is connected by way of a robust twist nut and locking pin physically engaging the male and female fittings, the likelihood of the coupling coming apart and causing accidental pressure discharge is greatly reduced.

What is claimed is:

1. A hydraulic fluid line coupling system, comprising;
   a female fitting comprising: a cylindrical inner wall, a shoulder, a hexagonally shaped flange, a cylindrical extension extending from the hexagonally shaped flange, and a plurality of angled grooves in the cylindrical extension, each angled groove including a longitudinal leg and a lateral leg;
   a male fitting received in the female fitting, the male fitting comprising: a radially outwardly directed rib having a plurality of circumferentially spaced gaps, a radial groove, and an axial groove;
   a first elastomeric seal received in the radial groove of the male fitting and positioned between the female fitting and the male fitting, the first elastomeric seal engaging the cylindrical inner wall of the female fitting;
   a second elastomeric seal received in the axial groove of the male fitting and positioned between the female fitting and the male fitting, the second elastomeric seal engaging the shoulder of the female fitting; and
   a twist nut securing the female fitting to the male fitting, the twist nut including a hexagonally shaped outer surface and a plurality of radially inwardly directed tabs, wherein the plurality of radially inwardly directed tabs on the twist nut are sized so as to be slidable through the gaps in the male fitting rib and plurality of angled grooves in the female fitting.

2. The hydraulic fluid line coupling system of claim 1, wherein the twist nut further includes a radially inwardly directed shoulder.

3. The hydraulic fluid line coupling system of claim 2, wherein the lateral legs hold the second elastomeric seal against the shoulder of the female fitting, and the radially inwardly directed shoulder of the twist nut against the radially outwardly directed rib of the male fitting.

4. The hydraulic fluid line coupling system of claim 3, wherein each of the plurality of radially inwardly directed tabs are axially slidable into one of the longitudinal legs of the plurality of angled grooves, and rotationally translatable into one of the lateral legs of the plurality of angled grooves.

5. The hydraulic fluid line coupling system of claim 4, further including at least one lock pin extending through the female fitting and twist nut.

6. A method of sealing a hydraulic fluid line coupling system as described in claim 1, comprising:
   inserting the male fitting into the female fitting;
   sealing the male fitting to the female fitting using the first and second elastomeric rings there between; and
   securing the female fitting to the male fitting using the twist nut.

7. The method of claim 6, further including positioning the first elastomeric ring radially between the male fitting and the female fitting.

8. The method of claim 7, further including positioning the second elastomeric ring axially between the male fitting and the female fitting.

9. The method of claim 6, further including and further including axially sliding the plurality of tabs into the plurality of angled grooves, and then rotating the twist nut such that the plurality of tabs rotationally translate within the plurality of angled grooves.

10. The method of claim 9, further including locking the twist nut to the female fitting using at least one locking pin.

11. A machine, comprising:
a chassis;
an engine mounted on the chassis;
a hydraulic fluid pump powered by the engine;
a hydraulic cylinder in fluid communication with the hydraulic fluid pump;
a plurality of hydraulic fluid tubes connecting the hydraulic fluid pump and the hydraulic cylinder; and
a hydraulic fluid line coupling system as recited in claim 1 connecting the plurality of hydraulic fluid tubes together.

12. The machine of claim 11, wherein further including at least one locking pin locking the female fitting to the twist nut.

* * * * *

UNITED STATES PATENT AND TRADEMARK OFFICE
CERTIFICATE OF CORRECTION

Page 1 of 1

PATENT NO. : 9,476,527 B2
APPLICATION NO. : 14/658932
DATED : October 25, 2016
INVENTOR(S) : Considine et al.

It is certified that error appears in the above-identified patent and that said Letters Patent is hereby corrected as shown below:

In the Claims

Column 7, Lines 4-5, Claim 9, delete "further including and further including" and insert -- further including --.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*